United States Patent
Carlson et al.

(10) Patent No.: US 10,495,839 B1
(45) Date of Patent: Dec. 3, 2019

(54) SPACE LASERCOM OPTICAL BENCH

(71) Applicant: BAE Systems Information and Electronic Systems Integration Inc., Nashua, NH (US)

(72) Inventors: Robert T Carlson, Bedford, NH (US); Mark C Janelle, Bedford, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 16/204,036

(22) Filed: Nov. 29, 2018

(51) Int. Cl.
| | |
|---|---|
| *G02B 7/00* | (2006.01) |
| *G02B 23/16* | (2006.01) |
| *G02B 26/08* | (2006.01) |
| *G02B 5/28* | (2006.01) |
| *G02B 27/09* | (2006.01) |
| *G01S 17/66* | (2006.01) |

(Continued)

(52) U.S. Cl.
CPC ............ *G02B 7/008* (2013.01); *G01J 1/0403* (2013.01); *G01J 1/0425* (2013.01); *G01J 1/0488* (2013.01); *G01J 1/4228* (2013.01); *G01J 1/44* (2013.01); *G01S 17/66* (2013.01); *G02B 5/28* (2013.01); *G02B 7/04* (2013.01); *G02B 23/16* (2013.01); *G02B 26/0816* (2013.01); *G02B 27/0955* (2013.01); *G02B 27/283* (2013.01); *G02B 27/30* (2013.01); *H04B 10/118* (2013.01); *H04B 10/1123* (2013.01); *H04B 10/503* (2013.01); *H04J 14/06* (2013.01); *G01J 2001/4266* (2013.01); *G01J 2001/4406* (2013.01)

(58) Field of Classification Search
USPC .................................................. 356/139.01
See application file for complete search history.

(56) References Cited

U.S. PATENT DOCUMENTS

| | | |
|---|---|---|
| 2,670,656 A | 3/1954 | Braymer |
| 5,138,484 A | 8/1992 | Schubert |

(Continued)

OTHER PUBLICATIONS

Pszczel, M.B., and D. Bucco. Review of techniques for in0flight transfer alignment. No. ARL-GW-TN-012. Aeronautical Research Labs Melbourne (Australia), 1992.

(Continued)

*Primary Examiner* — James R Hulka
(74) *Attorney, Agent, or Firm* — Maine Cernota & Rardin

(57) ABSTRACT

A lasercom coefficient of thermal expansion (CTE)-matched optical bench, with optional star-tracker capability, that includes a Transmitter (TX) fiber collimator creating a Gaussian beam from a singlemode (SM) or polarization maintaining (PM) fiber; a tiltball directly bonded to the optical bench, the tiltball performing centration of a TX beam with a telescope optical axis; a TX beam diverger creating a wide beam for acquisition, and a narrow beam for tracking and communications; a Point-Ahead Mechanism/mirror; a polarization diplexer cube or dichroic filter(s) separating TX and Receiver (RX) beams of opposite polarization and/or different wavelengths, wherein the polarization or dichroic and anti-reflective coatings are compatible with the adjunct star tracker; a fast-steering mechanism and mirror having a common-path to TX and RX; a RX optical passband filter; the RX optical passband filter having a flipper mechanism allowing for selecting the passband of the star-tracker or the RX passband.

20 Claims, 7 Drawing Sheets

OPTICAL BENCH, TELESCOPE, AND GIMBAL COMPONENTS

(51) Int. Cl.
*G01J 1/42* (2006.01)
*G01J 1/44* (2006.01)
*G01J 1/04* (2006.01)
*G02B 27/28* (2006.01)
*G02B 7/04* (2006.01)
*H04J 14/06* (2006.01)
*H04B 10/118* (2013.01)
*H04B 10/50* (2013.01)
*H04B 10/112* (2013.01)
*G02B 27/30* (2006.01)

(56) References Cited

U.S. PATENT DOCUMENTS

| | | |
|---|---|---|
| 5,155,327 A | 10/1992 | Hoag |
| 5,191,469 A | 3/1993 | Margolis |
| 5,808,732 A | 9/1998 | Llewely |
| 6,195,044 B1 | 2/2001 | Fowell |
| 6,285,927 B1 | 9/2001 | Li et al. |
| 6,504,502 B1 | 1/2003 | Wu et al. |
| 7,277,223 B2 | 10/2007 | Baun |
| 8,213,803 B2 | 7/2012 | Wu et al. |
| 9,260,335 B1 | 2/2016 | Miller et al. |
| 10,158,427 B2 * | 12/2018 | Carlson ............ H04B 10/118 |
| 10,230,467 B1 * | 3/2019 | Haessig, Jr. ........ H04B 10/67 |
| 10,236,980 B1 * | 3/2019 | Carlson ............ H04B 10/118 |
| 10,277,320 B1 * | 4/2019 | Haessig, Jr. ....... H04B 10/118 |
| 10,277,321 B1 * | 4/2019 | Carlson ............ H04B 10/503 |
| 10,298,327 B1 * | 5/2019 | Carlson ............ H04B 10/25 |
| 10,381,797 B1 * | 8/2019 | Ryba ............... H01S 3/1003 |
| 2002/0186479 A1 | 12/2002 | Schoppach |
| 2009/0152391 A1 | 6/2009 | McWhirk |
| 2009/0214216 A1 | 8/2009 | Miniscalco |
| 2009/0324236 A1 | 12/2009 | Wu |
| 2010/0329681 A1 * | 12/2010 | Carlson ............ H04B 10/112 398/79 |
| 2011/0261187 A1 | 10/2011 | Wang |
| 2014/0347720 A1 * | 11/2014 | Carlson ............ H04B 10/112 359/337.2 |
| 2015/0219767 A1 | 8/2015 | Humphreys |
| 2016/0043800 A1 | 2/2016 | Kingsbury |
| 2016/0046387 A1 | 2/2016 | Frolov |
| 2018/0262271 A1 * | 9/2018 | Carlson ............ H04B 10/118 |

OTHER PUBLICATIONS

Nguyen, Tam Nguyen Thuc. Laser beacon tracking for free-space optical communication on small-satellite platforms in low-earth orbit. Doss. Massachusetts Institute of Technology, 2015.

EP Search Report, EP 18160004.0, dated Jul. 10, 2018, 9 pages.

Guelman M et al., "Acquisition and pointing control for inter-satellite laser communications", IEEE Transactions on Aerospace and Electronic Systems, IEEE Service Center, Piscataway, NJ US, vol. 40, No. 4, Oct. 31, 2004 (Oct. 31, 2004), pp. 1239-1247, XP002623388, ISSN: 018-9251, D01: 10.1109/TAES.2004. 1386877. Section II; p. 1240-1242.

* cited by examiner

SATELLITE LASER-COM ENVIRONMENT

SIGNAL OF INTEREST BEACON STEPS FOR LASER COMMUNICATIONS

OPTICAL BENCH, TELESCOPE, AND GIMBAL COMPONENTS

OPTICAL BENCH AND TELESCOPE OPTICAL RAY PATH

OPTICAL BENCH COMPONENTS PERSPECTIVE VIEW

OPTICAL BENCH ASSEMBLY AND ALIGNMENT METHOD

SPACE LASERCOM OPTICAL BENCH

FIELD

The disclosure relates to wireless telecommunications, and more particularly, to a space lasercom optical bench device, system, and method that enables robust wireless laser communications.

BACKGROUND

Due to an explosion in both civilian and military wireless communication, there is a growing need for high speed, reliable, secure, wireless communication of large amounts of data between communicating nodes. It should be noted that the term "wireless" is used throughout this disclosure to refer to any communication that does not depend on a physical link between sender and receiver. Hence, the term "wireless", as used herein, excludes wired items such as wired fiber optic communication as well as wired communication over copper wires. It is noted that hybrid systems may have at least a portion of the communications that is wireless while other portions are in a wired format.

Traditional communication by wireless radio frequencies suffers from several shortcomings, many of which arise from the wide geographic dispersion of typical radio emissions (e.g. side lobes). Even when directional antennae and antenna arrays are used, radio signals are generally disbursed over large geographic areas, causing rapid attenuation of the signal strengths with distance, and also causing the signals to be relatively easy to intercept by unintended receivers. Due to the geographic overlap of radio communication signals, it is typically necessary to assign radio transmissions to specific frequency bands, which are often in limited supply. Furthermore, it is relatively easy for hostile antagonists to attempt to jam radio communications by transmitting radio signals at high energies that blanket a region of interest.

There are several approaches that attempt to address these problems of wireless radio communications. For example, bandwidth restrictions can be mitigated by opportunistically seeking and using bands that are nominally assigned to other uses, but are not currently in use. Various time and coding schemes can be employed to allow more than one communication link to share the same frequency band. So-called "multi-user" detection can also be employed to further distinguish signals transmitted on overlapping frequencies. The geographic range of wireless signals may also be extended by implementing signal relay nodes within a region of interest.

Security of wireless radio communications can be improved, for example, by employing secure transmission methods such as frequency "hopping," by adding pseudo-noise to communications, and by encoding communications with sophisticated, virtually impregnable cyphers. The Link 16 protocol is an example of this approach.

Nevertheless, all of these approaches to radio communication include significant disadvantages, such as increased cost and complexity, and message processing overhead that can slow communication and limit data transfer speeds.

Given these limitations, laser communication, or "lasercom," offers an attractive wireless alternative to radio communication, especially when point-to-point communication is required. Notably, the non-dispersed, extremely directional character of laser communication intrinsically avoids most of the problems that are associated with radio communication. In particular, there is no need to assign frequency bands to lasercom users, because interference between laser signal beams is avoided so long as two beams are not directed to the same recipient. Laser signals are ideally suited to long distance communication in space or at high altitudes because the tight beam results in lower geometric loss at the receive telescope. Communication security is also intrinsically high, as the interception of and interference with laser communications requires direct interception of a laser communication beam and/or focusing jamming beams directly at an intended signal receiver.

One important application that can benefit significantly from lasercom is satellite communications, where line-of-sight access is generally available, and where the communication distances are very great. Lasercom can provide communication data rates for satellites that are much higher than radio data rates, with unmatched anti-jam characteristics and an inherently low risk of communications intercept. Lasercom also eliminates the need for frequency planning and authorization, and circumvents the highly congested RF spectrum bandwidth constraints that limit the practical data rates available to users of RF links.

FIG. 1 depicts a satellite lasercom environment 100. Laser communications can be used for multi-Gbps (Giga-bits per second) connections 105 between space platforms 110, as well as connections 115 between ground-based nodes 120 and space platforms 110, owing to the availability of efficient, multi-watt laser sources and exceedingly high antenna gain, having beam widths of only 10-20 micro-radians and telescope apertures that are only four to eight inches in diameter. Even when much lower data rates of tens to hundreds of mega-bits per second (Mbps) are of interest, lasercom may be desirable due to its inherent Low Probability of Intercept (LPI), Low Probability of Detection (LPD), and anti-jam communications link security.

It should be noted that the disclosure herein is mainly presented with reference to satellite communication. However, it will be understood by those of skill in the art that the present disclosure is not limited to satellite communication, but also applies to other implementations of laser communication.

Of course, there are certain problems associated with laser communication that arise specifically from the very narrow divergence, extreme directionality, of laser beams. In particular, it is necessary for communicating nodes to identify each other and align their lasers so as to effectively communicate. In the case of satellite lasercom, these identification and alignment problems are especially acute, because laser sources that are well separated by terrestrial standards, for example several miles apart from each other, may nevertheless appear to be almost geographically overlapping from the viewpoint of a satellite. Furthermore, thermal, Doppler, and atmospheric effects can lead to both frequency (wavelength) and angular (apparent location) shifting of an incident laser communication beam, even after it is identified and aligned. The angular vibrational effects, together with other short-term mechanical instabilities of the satellite or other receiving node, are referred to herein collectively as "jitter."

FIG. 2 is a flow chart depicting steps 200 to establish and maintain laser communications. From a general perspective, there are at least four steps to establish and maintain laser communications. First, a candidate light source, referred to herein as a "hot spot," is identified from within a scene of interest 205. Second, the hot spot is verified as being a communication signal and its transmission source is identified so as to determine if it is a signal of interest (verify it is a beacon or communication beam that meets the Acquisition criteria) 210. Third, the optics of the lasercom receiving system is aligned with the incoming beam (capture or pull-in of the beacon) 215. Finally, once communication has been established, the beam is tracked during communication so that the alignment is maintained and the communication is not interrupted 220.

What is needed is a device, system, and method for a lasercom optical bench Acquisition and Tracking Sensor (ATS) (that also performs a star tracker precision orientation determination function, without the need for a separate star tracker) having a very compact form factor, an opto-mechanical design that enables cost-effective build and alignment, immunity to high-g loads from rocket launch loads and explosive bolt shocks, and ultra-stable on-orbit thermal performance for space production.

SUMMARY

An embodiment provides a lasercom optical bench device with thermal-expansion-matched optics and structure and an embedded star-tracker capability comprising a transmitter fiber collimator providing a diffraction-limited Gaussian beam from a fiber; a tiltball comprising coefficient of thermal expansion-matched glass directly bonded to the optical bench, the tiltball performing centration of a transmitter beam with a telescope optical axis; a transmitter beam diverger lens creating a wide beam for acquisition and diffraction-limited narrow beam for both tracking and communications; a point-ahead mechanism/mirror; an element for transmitter and receiver beams; a fast-steering mechanism and mirror having a common-path to transmitter and receiver; a receiver optical passband filter; the receiver optical passband filter comprising a flipper mechanism allowing for selecting a wide passband of the star-tracker, or a narrow receiver passband; wherein the optical star tracker and the lasercom coefficient of thermal expansion-matched optical bench device has a substantially same coefficient of thermal expansion as all optics, whereby it is thermally stable and stress-free. In embodiments the passband of the star-tracker is about 1000-1600 nm, and the passband of the receiver is about 1545-1570 nm. Other embodiments further comprise a strongback isolating the optical bench from structural and thermal loads, wherein the strongback comprises carbon-fiber. Subsequent embodiments comprise a strongback isolating the optical bench from structural and thermal loads, wherein the strongback comprises a titanium stiffener plate. Additional embodiments comprise a Quad Cell providing acquisition and functioning as the adjunct star tracker. In another embodiment, the fiber of the transmitter fiber collimator is a singlemode fiber, and the transmitter fiber collimator creates a diffraction-limited 2.0-9.0 mm FWe2 Gaussian beam. For a following embodiment a point-ahead mechanism provides up to 100 urad point-ahead. Subsequent embodiments comprise a fiber nutator for tracking. In additional embodiments the fiber of the transmitter fiber collimator is a polarization-maintaining (PM) fiber. In included embodiments the tiltball is a high index tiltball. In yet further embodiments the element for transmitter and receiver beams comprises a transmit-receive diplexer comprising a polarization diplexer cube separating transmitter and receiver beams of opposite polarization, wherein polarization and Anti-Reflective (AR) coatings are compatible with an adjunct star tracker. In related embodiments the element for transmitter and receiver beams comprises a transmit-receive diplexer comprising a dichroic filter penta configuration for transmitter and receiver beams of different wavelengths and or opposite polarization. Further embodiments comprise a pair of coarse receiver alignment wedges and a pair of fine receiver alignment wedges. Ensuing embodiments comprise a pair of coarse transmitter alignment wedges and a pair of fine tracking alignment wedges.

Another embodiment provides a method for assembling and aligning an optical star tracker and lasercom system optical bench comprising assembling a heater to a coefficient of thermal expansion (CTE)-matched optical bench; bonding the optical bench to a low-CTE high-strength strongback; bonding all fixed-position optics to the optical bench; aligning a transmit path such that a beam exits substantially perpendicular to the optical bench; aligning a receive (RX) ACQuisition (ACQ) path to the transmit path; installing a Variable Focus Mechanism (VFM) in the transmit path; adjusting a diverger lens position; verifying RX ACQ is still valid; aligning the RX path to a nutator; installing a RX light shield; verifying RX functionality; installing an outer cover; and routing all optical fiber and other cabling inside an enclosure of the optical bench. For yet further embodiments, the step of assembling a heater to a CTE-matched optical bench comprises a pressure sensitive adhesive. For more embodiments, the step of aligning a transmit path is accomplished without a variable focus mechanism installed. In continued embodiments, the step of bonding all fixed-position optics to the optical bench comprises bonding fold prisms and a RX ACQ reflect filter. Additional embodiments further comprise steps of integrating the aligned optical bench with a separately aligned telescope together into a single assembly with a structural strongback; the structural strongback providing attachment of the optical bench to the telescope; and interfacing the optical bench and the telescope to a gimbal.

A yet further embodiment provides an optical star tracker and lasercom system optical bench comprising a structural strongback comprising an AlBeMet 5-sided box structure; a transmitter fiber collimator; a pair of coarse transmitter alignment wedges; a pair fine alignment wedges; one or more transmitter right angle fold prisms with coefficient of thermal expansion-matched glass directly bonded to the optical bench; a tiltball comprising coefficient of thermal expansion-matched glass directly bonded to the optical bench, the tiltball performing centration of a transmitter beam with a telescope optical axis; a transmitter beam diverger with micron-accuracy lens motion and stability creating a wide beam for acquisition and diffraction-limited narrow beam for both tracking and communications; a point-ahead mechanism/mirror; one of either a polarization diplexer cube or a dichroic filter assembly separating transmitter and receiver beams of either opposite polarization or different wavelengths, wherein polarization and anti-reflective coatings are compatible with an adjunct star tracker; a fast-steering mechanism and mirror having a common-path to transmitter and receiver; a receiver optical passband filter; the receiver optical passband filter comprising a flipper mechanism allowing for selecting the star-tracker having a 1000-1600 nm passband, or a 1545-1570 nm receiver passband; receiver right angle fold prisms or glass penta prisms with coefficient of thermal expansion-matched glass directly bonded to the optical bench for the 1000-1600 nm passband; an acquisition/tracking dichroic filter providing separation of acquisition and tracking/communications wavelengths; a pair of coarse receiver alignment wedges; a pair fine alignment wedges providing microradian angular alignment on acquisition and tracking/communications receiver legs; inertial measurement units performing 4-1000 Hz jitter sensing used for fast steering mirror inertial stabilization; and a receiver lightshield cover comprising a metal opaque barrier for all receiver optics on one side of the optical bench, whereby scattered light from transmitter optics is spatially blocked, and all light passes through the receiver optical filter; wherein the optical bench comprises structural support carbon material and has a substantially same coefficient of thermal expansion as all optics, whereby it is thermally stable and stress-free.

Figure 1:
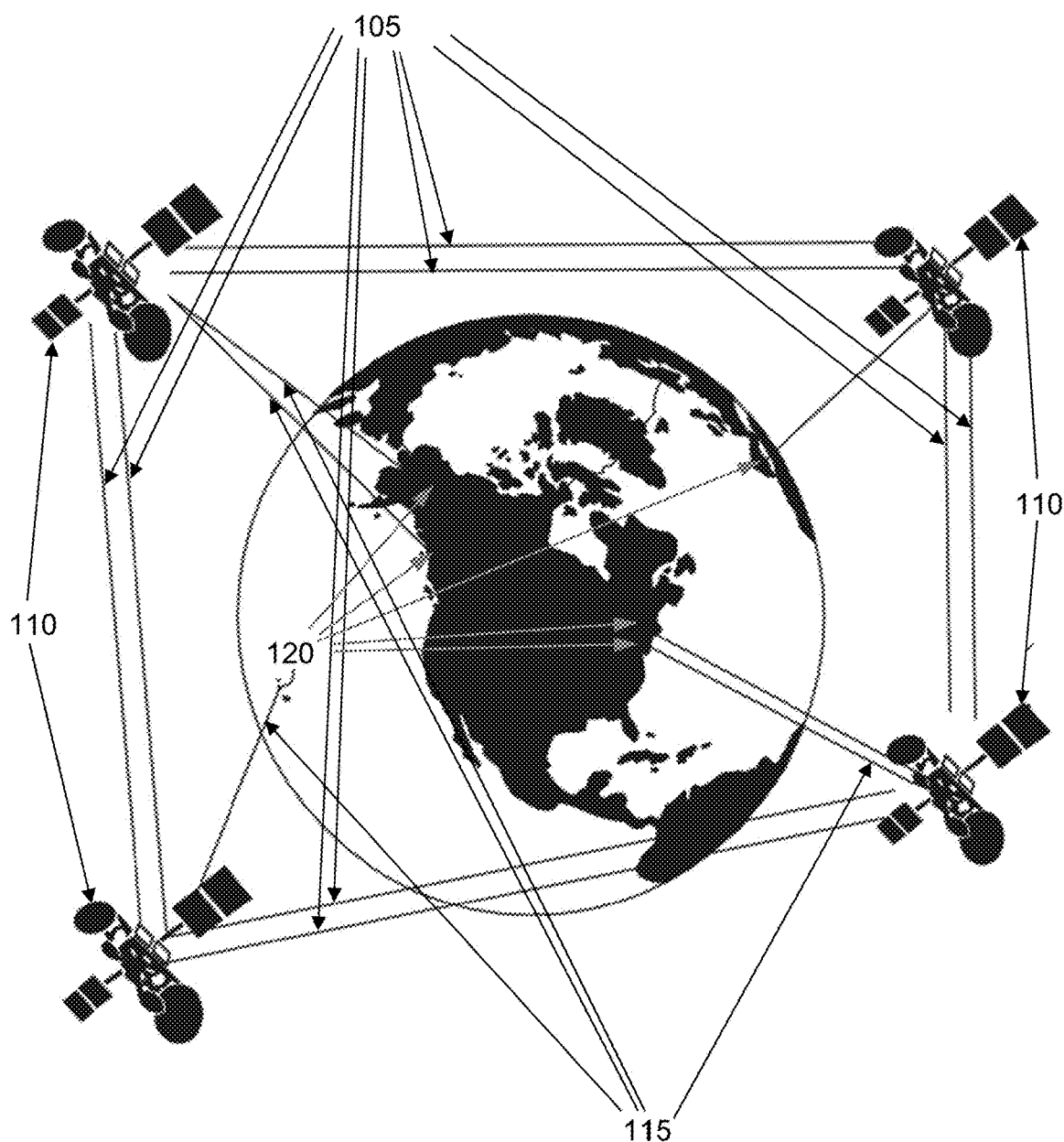
FIG. 1 illustrates lasercom communication between orbiting satellites, and between the satellites and ground-based nodes.
Figure 2:
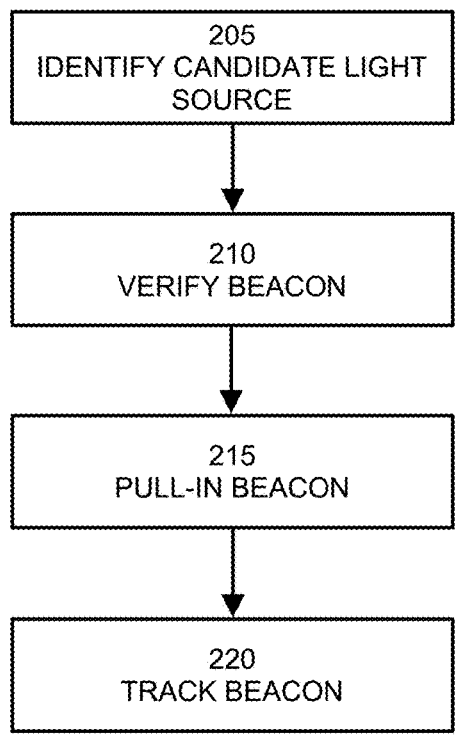
FIG. 2 is a generalized flow chart illustrating steps for aligning a lasercom receiving system with a transmitting node.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Each of U.S. patent application Ser. No. 15/457,081 filed Mar. 13, 2017 titled Celestial Navigation Using Laser Communication System; application Ser. No. 15/968,083 filed May 1, 2018 titled Apparatus and Method for Rapid Identification of Laser Communication Beacons; application Ser. No. 16/000,991 filed Jun. 6, 2018 titled Apparatus and Method for Rapid Identification of Laser Communication Beacons; application Ser. No. 16/001,225 filed Jun. 6, 2018 titled Flexible Design for a Tunable Optical Filter (TOF) Processing Block; application Ser. No. 16/002,052 filed Jun. 7, 2018 titled Apparatus and Method for Rapid Identification of Candidate Laser Communication Beacons; application Ser. No. 16/003,690 filed Jun. 8, 2018 titled Pointing Control with Fiber Nutation; and application Ser. No. 16/122,999 filed Sep. 6, 2018 titled Acquisition and Pointing Device, System, and Method Using Quad Cell is herein incorporated by reference in its entirety for all purposes.

Embodiments comprise a compact optical bench designed to be integrated onto the rear of a space lasercom telescope and gimbal resulting in a cost-effective design solution for space production. In alternate embodiments the bench is located remotely via a gimbal Coudé path. The optical bench material is CTE-matched to the optics and optics cells, which are directly bonded with low-CTE adhesives rather than using tip-tilt adjustable optical mounts, resulting in a very compact design with ultra-stable thermal performance. This therefore does not require tight thermal control of the bench and optics. The design uses radhard materials and glasses. Embodiment profiles are a square-shaped bench that will mount to the rear of the telescope housing, providing bench components and mechanisms that are the most compatible with high launch loads, vacuum, and the high radiation environment, thereby providing 10-20 year reliability in space. In embodiments, the optical bench housing enclosure is made of 200 mil aluminum walls and a cover for radiation shielding to 100 krad total ionizing dose (TID) in geostationary orbit (GEO) or elliptical 12-24 hour orbits, or 6-12 hour medium earth orbits (MEO). Less shielding is required for low earth orbits (LEO). In cases where the structural strongback is a dissimilar material from the telescope, optical bench, and gimbal that it joins, elastomeric bonds or thermal flexures can be used.

In one embodiment, the optical bench, along with the telescope and gimbaled pointing system, is designed to realize the unique concept of using the lasercom optical system to realize a precision star fix for initial pointing information, in addition to the lasercom function. This requires telescope and bench optical designs that perform well over the very broad 600 nm spectral region (1000-1600 nm) for the adjunct star tracker function, as well as the narrow 30 nm region (1540-1570 nm) for the lasercom operation.

Figure 3:
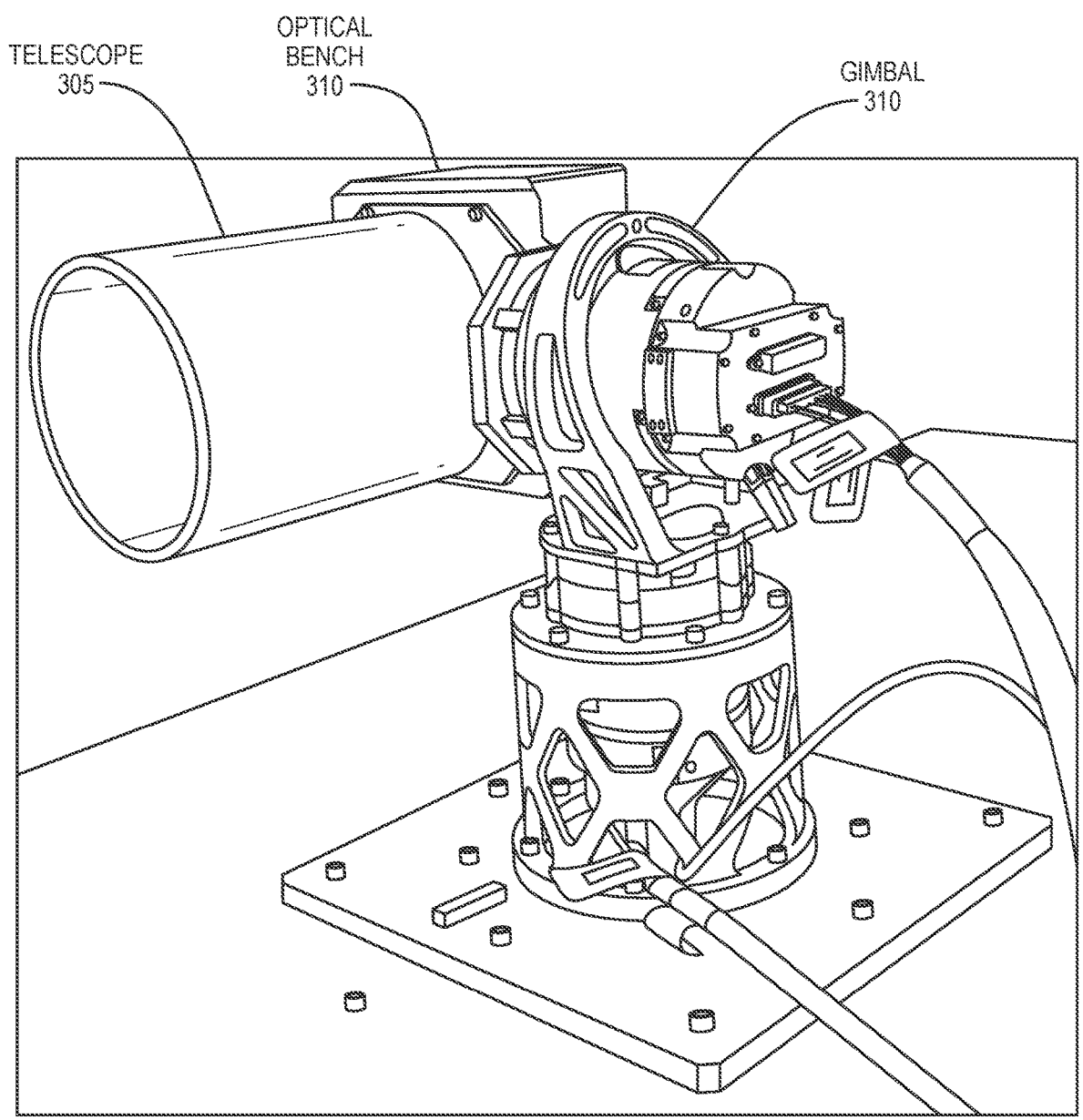
FIG. 3 depicts optical bench, telescope, and gimbal components configured in accordance with an embodiment.

FIG. 3 depicts optical bench, telescope, and gimbal components 300. The overall lasercom system is shown including telescope 305; optical bench 310; and gimbal 315. Alternate gimbal configurations are also applicable, such as a yoke concept, a Coudé path gimbal, or a highly balanced configuration such as an inner gimbal within an outer yoke.

Figure 4:
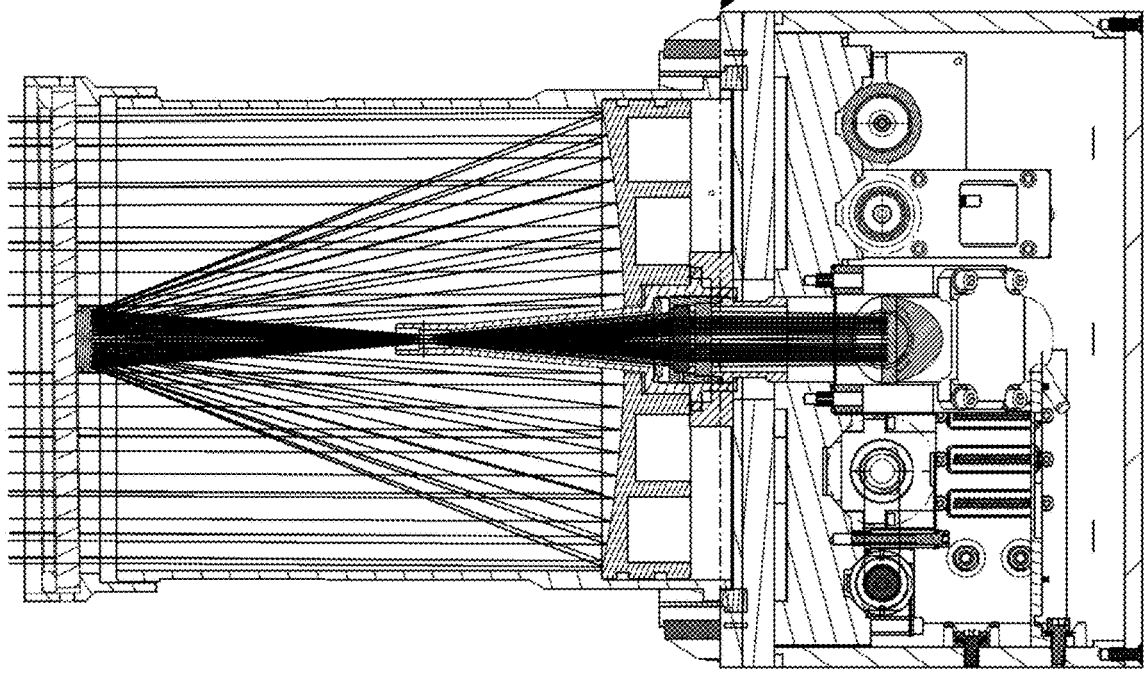
FIG. 4 depicts optical bench and telescope optical ray path configured in accordance with an embodiment.

FIG. 4 depicts optical bench and telescope optical ray path 400. Principal components of this embodiment comprise telescope 405 and optical bench 410. Also shown is the strongback mount flange 415.

Figure 5:
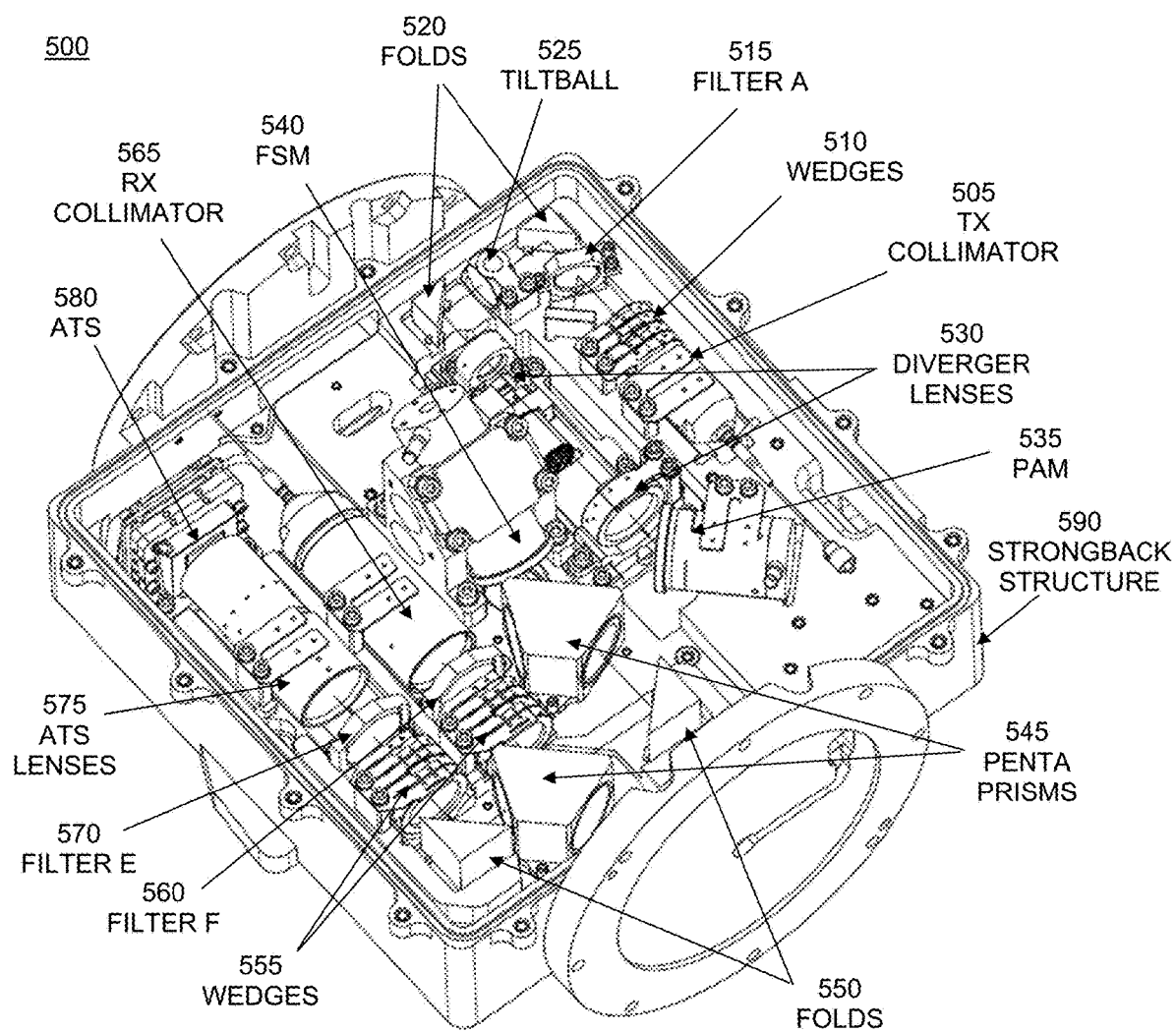
FIG. 5 is an optical bench components solid model perspective view configured in accordance with an embodiment.

FIG. 5 is an optical bench components solid model perspective view 500. Optical bench basic architecture and design features comprise a BeBeO-20 optical bench having substantially the same CTE as all the optics, resulting in a stress-free condition that is ultra-stable thermally. This BeBeO-20 material is very high strength, and was also selected to meet strenuous launch load conditions. The optical bench is joined to a strongback 590 using flexures or elastomeric bonds. An alternate embodiment for a less dynamic environment (mechanically isolated payload) is a carbon bench with a CTE-matched titanium stiffener plate to interface to a strongback. This stiffener improves the rigidity of the carbon bench. A carbon-fiber strongback is a very strong but lightweight solution that supports the telescope on one side, and the optical bench on the other.

A first embodiment comprises: A transmitter (TX) fiber collimator 505 creates a diffraction-limited Gaussian beam, typically 2.0-9.0 mm FWe2, from a singlemode (SM) or polarization-maintaining (PM) fiber. A pair of coarse TX alignment wedges 510 and a pair of fine alignment wedges are used to realize microradian angular alignment. Filter A 515 in this example is a bandpass filter. TX right angle fold prisms ("FOLDS") 520 with CTE-matched glass are directly bonded to the bench, with 99.9% reflective coating on the hypotenuses. A tiltball plane-parallel plate in a spherical seat 525 with CTE-matched glass, typically of high refractive index, is directly bonded to the bench, with 99.9% reflective coating on both faces. This optic performs centration of the TX beam with the telescope optical axis. A TX beam diverger 530 with micron-accuracy lens motion and stability is used to create a wide beam for acquisition and diffraction-limited narrow beam for tracking (TRK)/communications (COM). A point-ahead mechanism/mirror (PAM) 535 has sub-microradian resolution and point-ahead (PA) range of +/−100 urad. A penta prism 545 reflects the TX signal onto a fast-steering mechanism and mirror (FSM) 540. This FSM has a common-path (TX and RX) to the telescope through a hole in the bench. This FSM has submicroradian resolution and a steering range of +/−500 urad. The penta prism allows the RX signal to pass through to a fold prism ("FOLDS") 550. A second penta prism 545 divides the RX signal into the RX collimator 565 and acquisition tracking sensor (ATS) 580 paths. RX fine and coarse wedges 555 are used to realize microradian angular alignment. Filter F 560 and filter E 570 in this example are bandpass filters. ATS lenses 575 focus to a point on the ATS focal plane.

Figure 6:
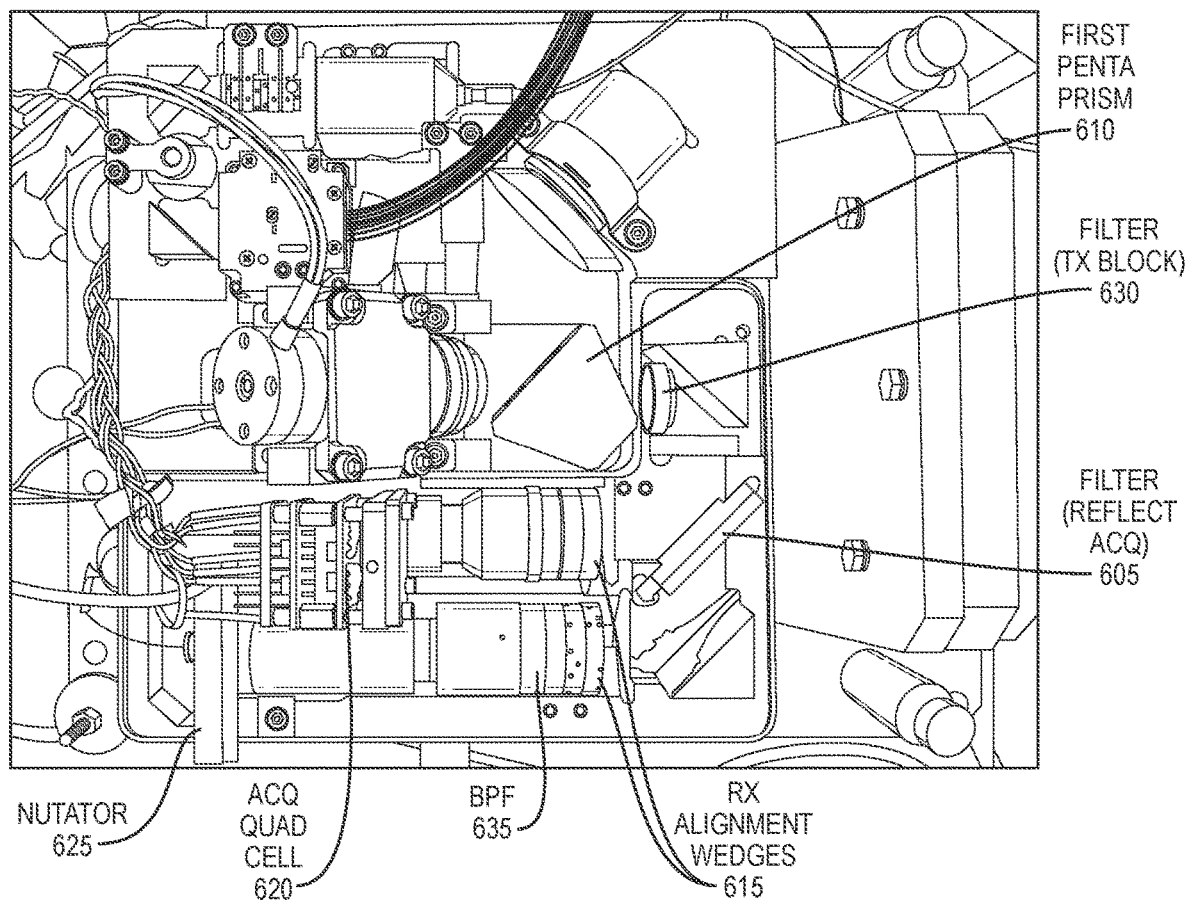
FIG. 6 depicts optical bench alternate embodiment components detail configured in accordance with an embodiment.

FIG. 6 depicts an alternate embodiment for the optical bench RX components 600. The TX path remains unchanged. In this embodiment, in place of the second Penta Prism, an ACQ/TRK dichroic filter 605 provides 45 deg separation of the closely-spaced ACQ and TRK/COM wavelengths. (First Penta Prism 610 remains.) A pair of coarse and fine RX alignment wedges 615 are used to realize microradian angular alignment on the ACQ and TRK/COM RX legs. An ACQ Quad Cell 620 and optic with 'wide' FOV, circa 1 mrad, supports initial ACQ. RX fiber nutator 625 and optic with ultra-narrow diffraction-limited FOV, circa 25 urad. The novel architecture uses this device with a low bandwidth that minimizes power dissipation on the bench. The device performs DC-10 Hz sensing, while inertial measurement units (IMUs) perform 4-1000 Hz jitter sensing used for FSM stabilization. The IMUs for azimuth and elevation 4-1000 Hz jitter sensing have sub-microradian sensitivity. The devices are very low power, and very accurate. The RX lightshield cover (not shown) is a metal opaque barrier for all the RX optics on one side of the bench. Scattered light from the TX optics is spatially blocked, and all light must pass through the RX optical filters 605, 630, and 635.

Another optical embodiment replaces the penta prism after the FSM with a polarization diplexer cube to separate the TX and RX beams of opposite polarization. Polarization and AR coatings are compatible with the adjunct star tracker application, 1000-1600 nm. An RX optical passband filter with a flipper mechanism can be used for a selectable star tracker 1000-1600 nm passband, or a 1545-1570 nm RX passband.

Figure 7:
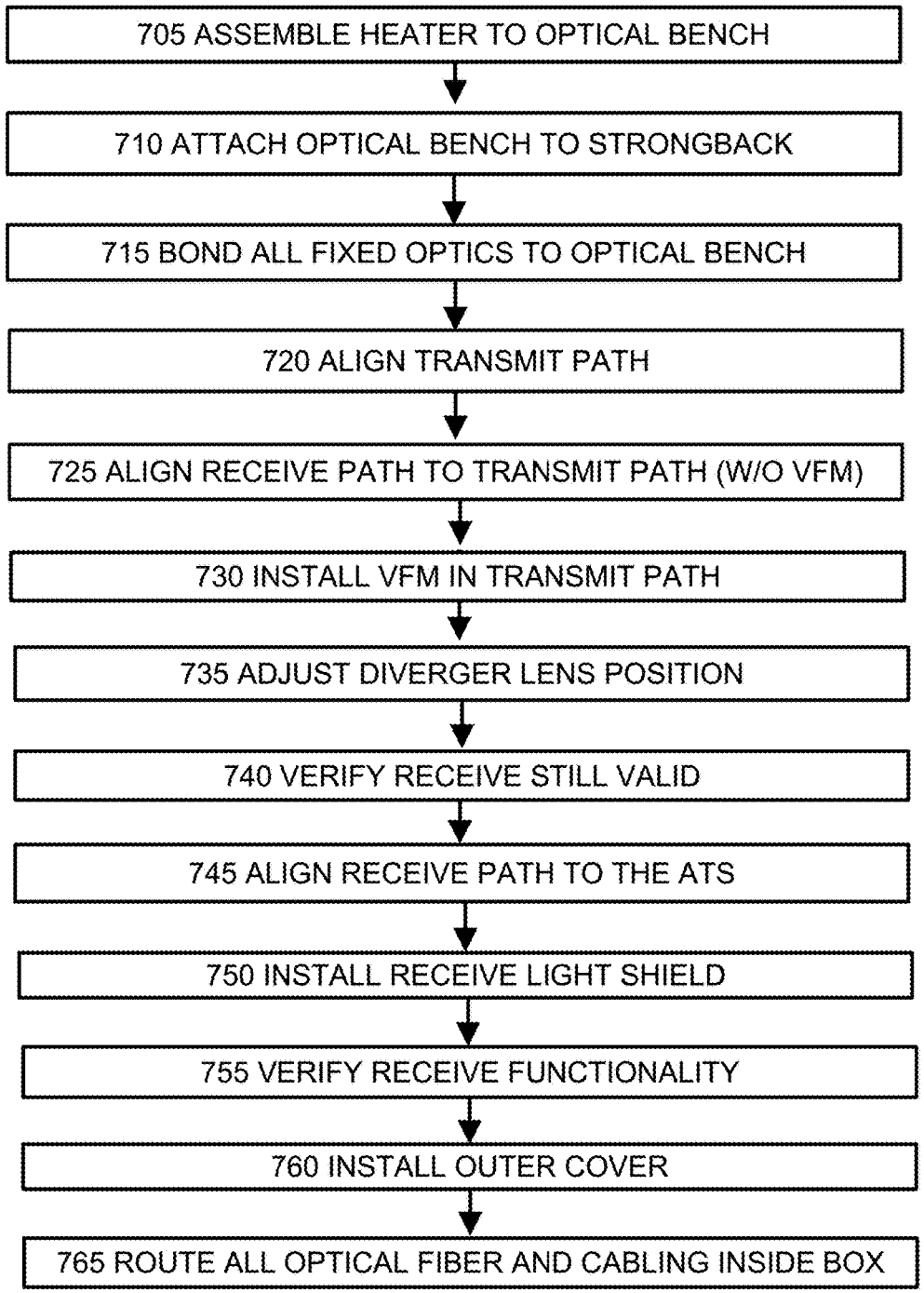
FIG. 7 is a flow chart for an optical bench assembly and alignment method configured in accordance with an embodiment.

FIG. 7 depicts an optical bench assembly and alignment method 700 comprising the steps of: assembling a heater to the graphite optical bench (using a pressure sensitive adhesive) 705; attaching the optical bench to a strongback 710; bonding all fixed position optics to the optical bench (i.e. fold prisms, tiltball, RX acquisition (ACQ) reflect filter, etc.) 715; aligning TX path (without variable focus mechanism (VFM) installed) such that the beam exits perpendicular to the bench 720; aligning RX path to the TX path defined in the previous step 725; installing the VFM in the TX path 730; adjusting a diverger lens position 735; verifying RX is still valid 740; aligning the RX path to the ATS 745; installing RX light shield 750; verifying RX functionality 755; installing outer cover 760; and route all optical fiber and other cabling inside the box 765.

For embodiments, the telescope is aligned to the optical bench assembly using a custom optical setup with an InGaAs focal plane array camera. First, an optical camera is positioned at the focal point of an off-axis parabola (OAP). The optical bench assembly is then positioned to the OAP such that the TX collimated light is aligned to the camera. The telescope is then positioned directly in front of the optical bench assembly. The clocking of the telescope (it has a quarter waveplate (QWP)) is determined using a power wand on the light exiting the window of the telescope. The clocking position is marked on the telescope and on the strongback. The telescope is translated away from the optical bench assembly so a bead of epoxy can be applied to the flange. The telescope is then translated back and mated to the strongback. Finally, the alignment is verified on the camera while the telescope bond to the strongback cures. In an alternate preferred implementation, the QWP is the last element in the optical bench, rather than in the telescope.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A lasercom optical bench device with thermal-expansion-matched optics and structure and an embedded star-tracker capability comprising:
    a transmitter fiber collimator providing a diffraction-limited Gaussian beam from a fiber;
    a tiltball comprising coefficient of thermal expansion-matched glass directly bonded to said optical bench, said tiltball performing centration of a transmitter beam with a telescope optical axis;
    a transmitter beam diverger lens creating a wide beam for to acquisition and diffraction-limited narrow beam for both tracking and communications;
    a point-ahead mechanism/mirror;
    an element for transmitter and receiver beams;
    a fast-steering mechanism and mirror having a common-path to transmitter and receiver;
    a receiver optical passband filter;

said receiver optical passband filter comprising a flipper mechanism allowing for selecting a wide passband of said star-tracker, or a narrow receiver passband;
wherein said optical star tracker and said lasercom coefficient of thermal expansion-matched optical bench device has a substantially same coefficient of thermal expansion as all optics, whereby it is thermally stable and stress-free.

2. The device of claim 1 wherein said passband of said star-tracker is about 1000-1600 nm, and said passband of said receiver is about 1545-1570 nm.

3. The device of claim 1 further comprising:
a strongback isolating said optical bench from structural and thermal loads, wherein said strongback comprises carbon-fiber.

4. The device of claim 1 comprising:
a strongback isolating said optical bench from structural and thermal loads, wherein said strongback comprises a titanium stiffener plate.

5. The device of claim 1 comprising:
a Quad Cell providing acquisition and functioning as said adjunct star tracker.

6. The device of claim 1 wherein said fiber of said transmitter fiber collimator is a singlemode fiber, and said transmitter fiber collimator creates a diffraction-limited 2.0-9.0 mm FWe2 Gaussian beam.

7. The device of claim 1 wherein a point-ahead mechanism provides up to 100 urad point-ahead.

8. The device of claim 1 comprising a fiber nutator for tracking.

9. The device of claim 1 wherein said fiber of said transmitter fiber collimator is a polarization-maintaining (PM) fiber.

10. The device of claim 1 wherein said tiltball is a high index tiltball.

11. The device of claim 1 wherein said element for transmitter and receiver beams comprises a transmit-receive diplexer comprising a polarization diplexer cube separating transmitter and receiver beams of opposite polarization, wherein polarization and Anti-Reflective (AR) coatings are compatible with an adjunct said star tracker.

12. The device of claim 1 wherein said element for transmitter and receiver beams comprises a transmit-receive diplexer comprising a dichroic filter penta configuration for transmitter and receiver beams of different wavelengths and or opposite polarization.

13. The device of claim 1 comprising a pair of coarse receiver alignment wedges and a pair of fine receiver alignment wedges.

14. The device of claim 1 comprising a pair of coarse transmitter alignment wedges and a pair of fine tracking alignment wedges.

15. A method for assembling and aligning an optical star tracker and lasercom system optical bench comprising:
assembling a heater to a coefficient of thermal expansion (CTE)-matched optical bench;
bonding said optical bench to a low-CTE high-strength strongback;
bonding all fixed-position optics to said optical bench;
aligning a transmit path such that a beam exits substantially perpendicular to said optical bench;
aligning a receive (RX) ACQuisition (ACQ) path to said transmit path;
installing a Variable Focus Mechanism (VFM) in said transmit path;
adjusting a diverger lens position;
verifying RX ACQ is still valid;
aligning said RX path to a nutator;
installing a RX light shield;
verifying RX functionality;
installing an outer cover; and
routing all optical fiber and other cabling inside an enclosure of said optical bench.

16. The method of claim 15, wherein said step of assembling a heater to a CTE-matched optical bench comprises a pressure sensitive adhesive.

17. The method of claim 15, wherein said step of aligning a transmit path is accomplished without a variable focus mechanism installed.

18. The method of claim 15, wherein said step of bonding all fixed-position optics to said optical bench comprises bonding fold prisms and a RX ACQ reflect filter.

19. The method of claim 15, further comprising steps of integrating said aligned optical bench with a separately aligned telescope together into a single assembly with a structural strongback;
said structural strongback providing attachment of said optical bench to said telescope; and
interfacing said optical bench and said telescope to a gimbal.

20. An optical star tracker and lasercom system optical bench comprising:
a structural strongback comprising an AlBeMet 5-sided box structure;
a transmitter fiber collimator;
a pair of coarse transmitter alignment wedges;
a pair fine alignment wedges;
one or more transmitter right angle fold prisms with coefficient of thermal expansion-matched glass directly bonded to said optical bench;
a tiltball comprising coefficient of thermal expansion-matched glass directly bonded to said optical bench, said tiltball performing centration of a transmitter beam with a telescope optical axis;
a transmitter beam diverger with micron-accuracy lens motion and stability creating a wide beam for acquisition and diffraction-limited narrow beam for both tracking and communications;
a point-ahead mechanism/mirror;
one of either a polarization diplexer cube or a dichroic filter assembly separating transmitter and receiver beams of either opposite polarization or different wavelengths, wherein polarization and anti-reflective coatings are compatible with an adjunct said star tracker;
a fast-steering mechanism and mirror having a common-path to transmitter and receiver;
a receiver optical passband filter;
said receiver optical passband filter comprising a flipper mechanism allowing for selecting said star-tracker having a 1000-1600 nm passband, or a 1545-1570 nm receiver passband;
receiver right angle fold prisms or glass penta prisms with coefficient of thermal expansion-matched glass directly bonded to said optical bench for said 1000-1600 nm passband;
an acquisition/tracking dichroic filter providing separation of acquisition and tracking/communications wavelengths;
a pair of coarse receiver alignment wedges;
a pair fine alignment wedges providing microradian angular alignment on acquisition and tracking/communications receiver legs;

inertial measurement units performing 4-1000 Hz jitter sensing used for fast steering mirror inertial stabilization; and a receiver lightshield cover comprising a metal opaque barrier for all receiver optics on one side of said optical bench, whereby scattered light from transmitter optics is spatially blocked, and all light passes through said receiver optical filter;

wherein said optical bench comprises structural support carbon material and has a substantially same coefficient of thermal expansion as all optics, whereby it is thermally stable and stress-free.

* * * * *